Oct. 17, 1967 W. J. SCHIESER ETAL 3,347,328
LEAF SPRING SUSPENSION WEIGHING SCALE
Filed Sept. 15, 1965 5 Sheets-Sheet 1
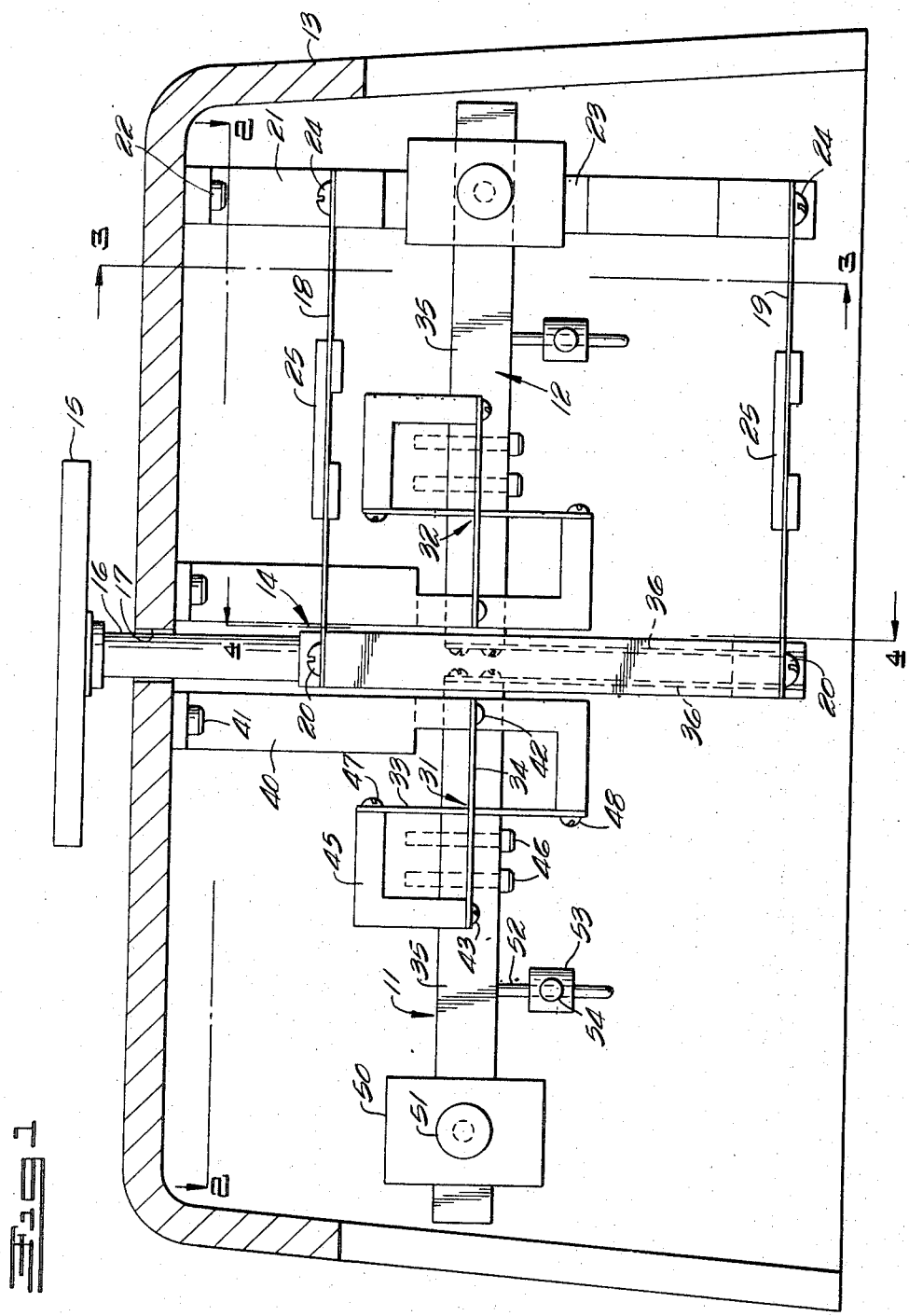
INVENTORS
WARREN J. SCHIESER
WILLIAM HECOX
CHARLES F. PEASLEY
MAHONEY, MILLER & RAMBO
BY
ATTORNEYS Oct. 17, 1967 W. J. SCHIESER ETAL 3,347,328
LEAF SPRING SUSPENSION WEIGHING SCALE
Filed Sept. 15, 1965 5 Sheets-Sheet 2
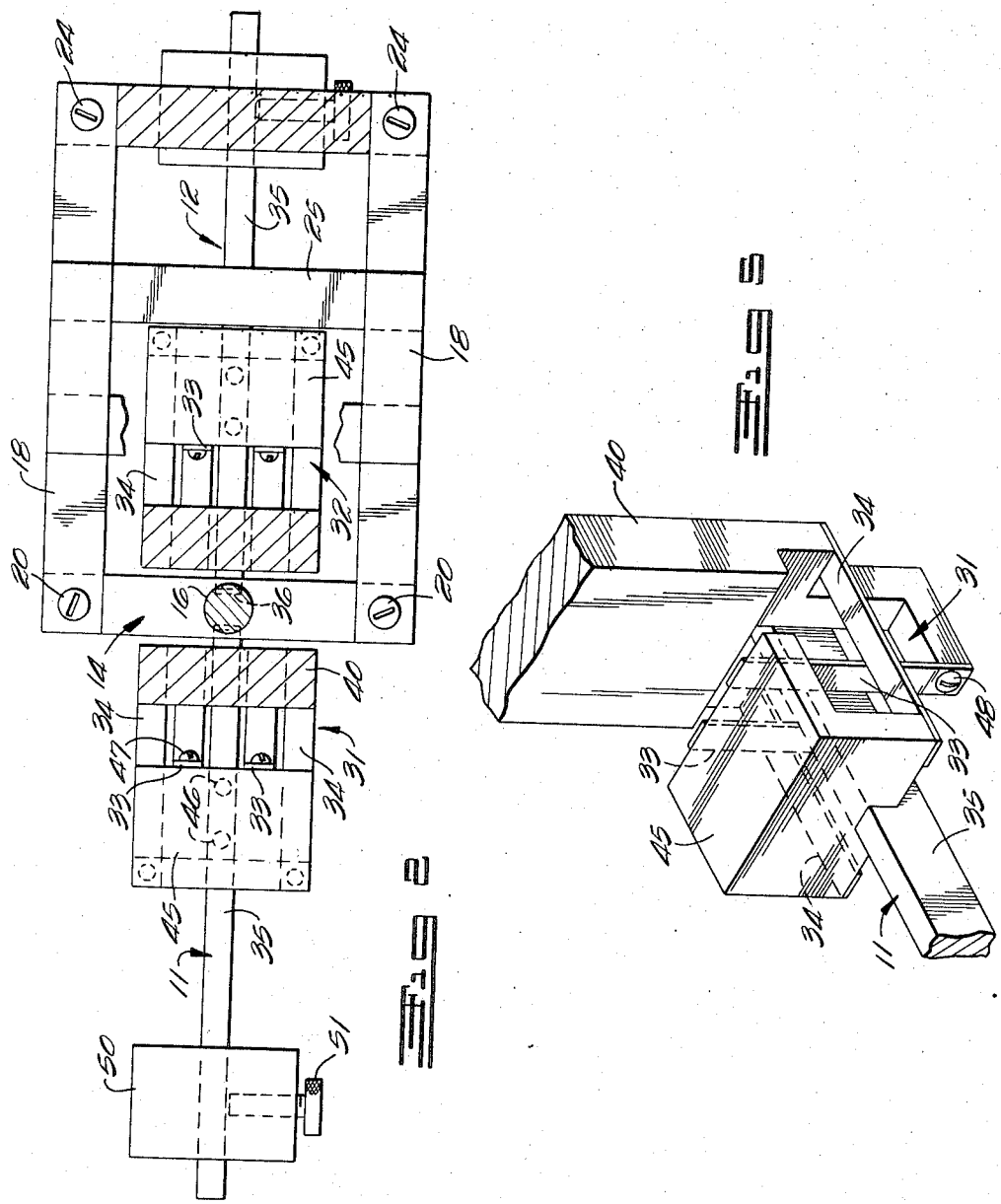
INVENTORS
WARREN J. SCHIESER
WILLIAM HECOX
CHARLES F. PEASLEY
MAHONEY, MILLER & RAMBO
BY
ATTORNEYS

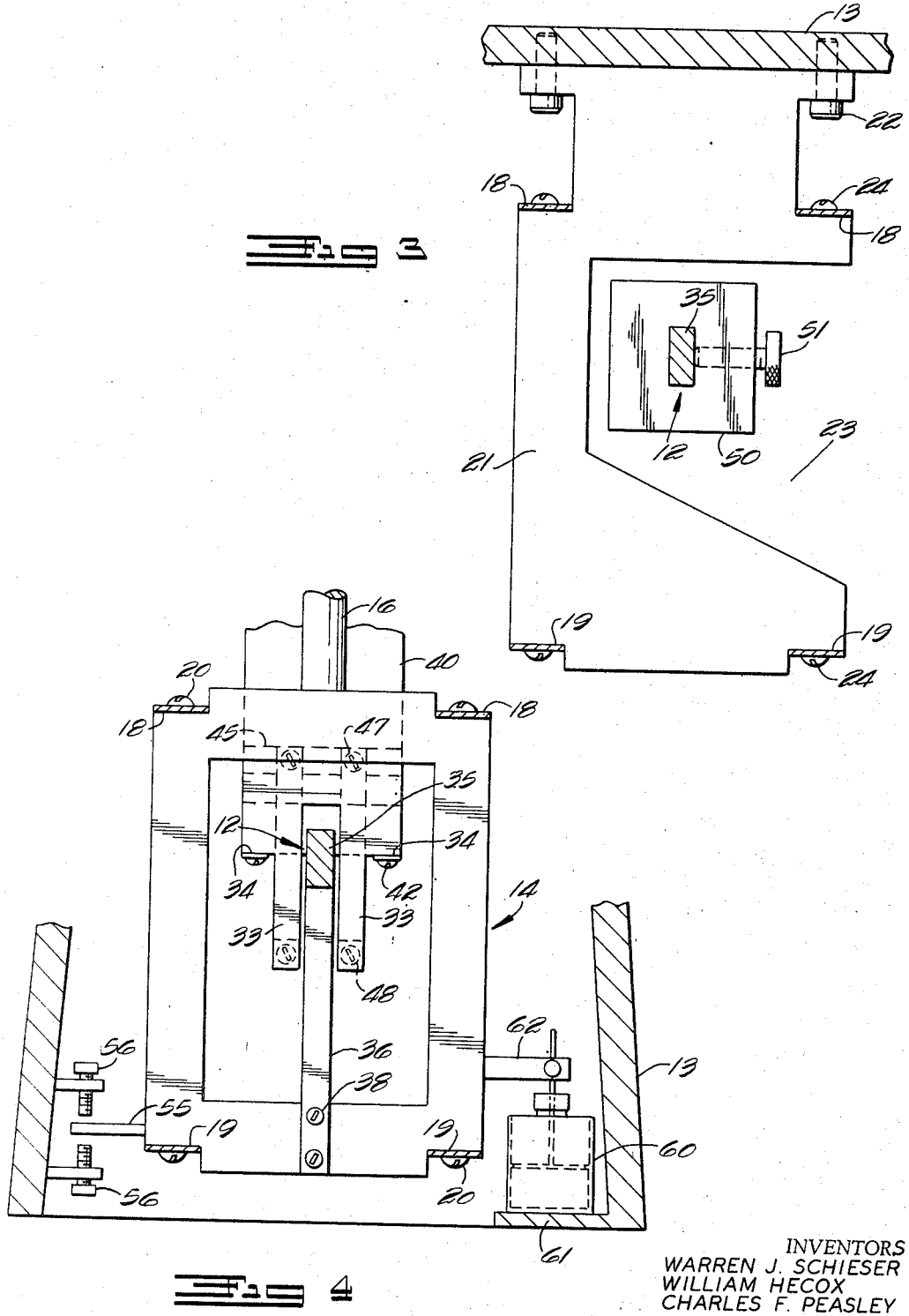

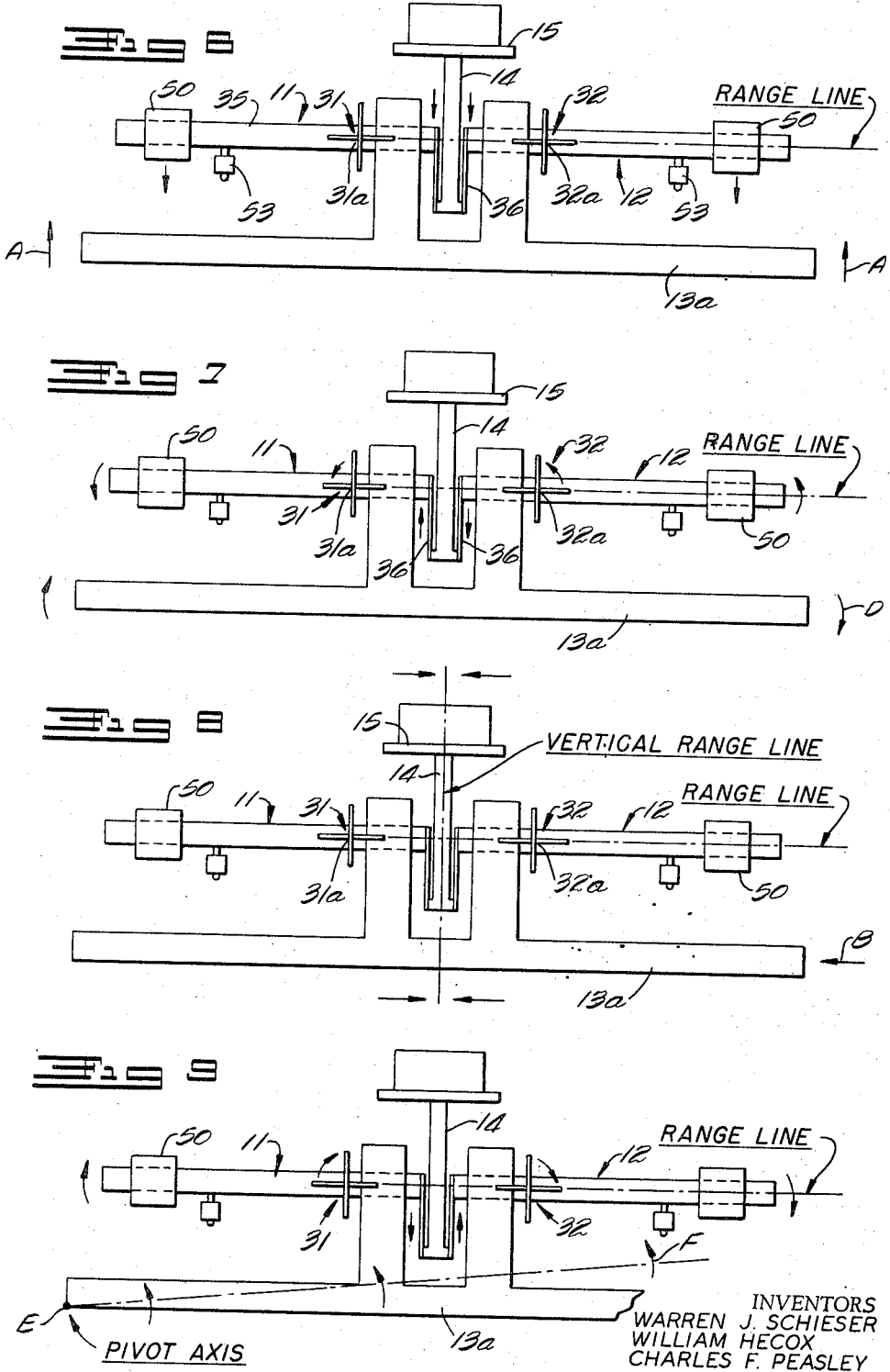

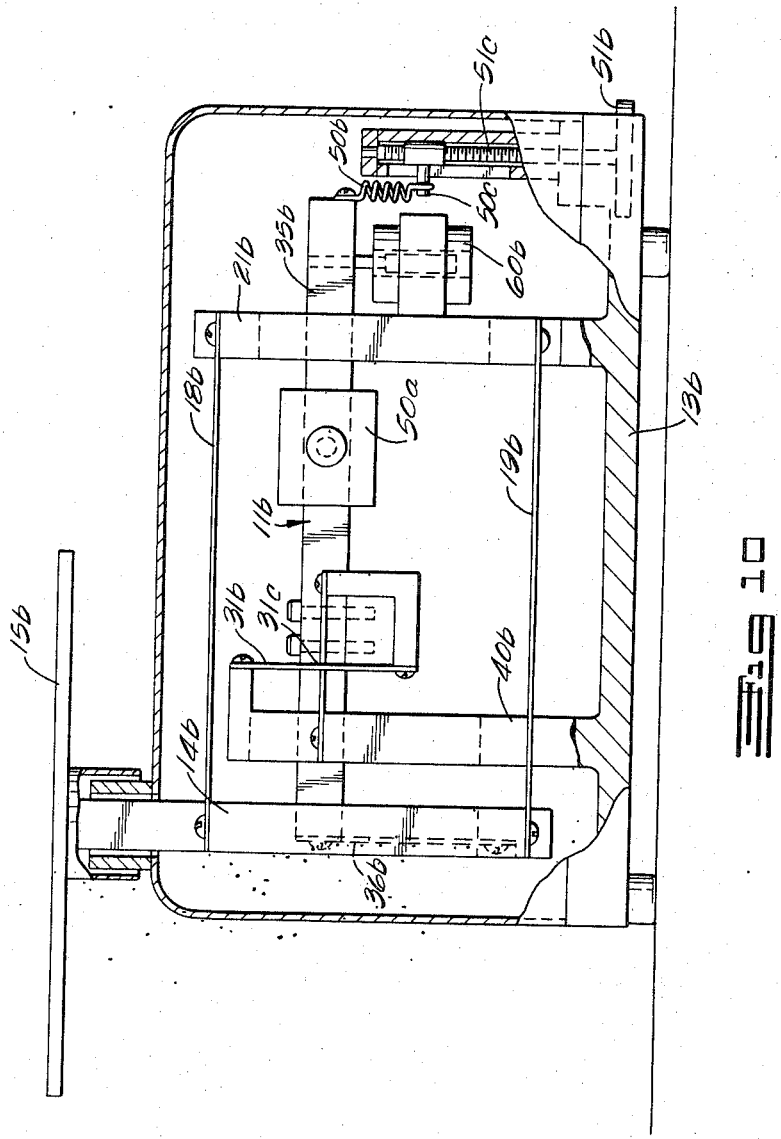

United States Patent Office 3,347,328
Patented Oct. 17, 1967

3,347,328
LEAF SPRING SUSPENSION WEIGHING SCALE
Warren J. Schieser, Columbus, William Hecox, Canal Winchester, and Charles F. Peasley, Westerville, Ohio, assignors, by mesne assignments, to Exact Weight Scale Corporation, Columbus, Ohio, a corporation of Ohio
Filed Sept. 15, 1965, Ser. No. 487,551
7 Claims. (Cl. 177—229)

ABSTRACT OF THE DISCLOSURE

A weighing scale comprising a weighing lever having a longitudinal axis extending through the center of mass thereof supported by crossed flexures for swinging or weighing movement. The crossed flexures provide a fulcrum point for the weighing lever at the point where they cross and this fulcrum point is so located that the lever axis extends through this fulcrum point so that equal masses are located above and below the lever axis and to the right and left of the fulcrum point.

---

It is commonly known that conventional scales and weighing systems, though comprising the most accurate means of measuring weights of objects and materials, also are inherently limited in their ability to operate under conditions of vibration and shock, because such disturbances exert forces on the mechanism that cause it to indicate, register or produce an output that cannot be readily distinguished from an output representing weight on the device. Shock and vibrational disturbances are especially detrimental to fast response weighing systems such as those required in modern automated systems where commodities are weighed at speeds of several hundred per minute. However, an ability to withstand shock and vibrational disturbance is a valuable factor in weighing at any speed.

It is well known that packaging machinery and other machines on which scales are frequently mounted, usually generate vibrations within their own framework that cover a spectrum of frequencies ranging from an extremely low frequency shock cycle through several thousand cycles per minute. The many mechanisms within such machinery travel at different speeds and have varying degrees of unbalance creating disturbances which are transmitted through their own frameworks, through floors, and to other equipment. Such disturbances are complex and continuously varying in pattern. The heretofore attempts in the prior art to filter out disturbance frequencies from weight signals of weighing systems has proved generally ineffective because of the unpredictable and varying pattern of disturbances described above. It is obvious that some disturbances transmitted to the scale or weighing system could be of the same, or nearly the same, frequency as the weigh system response cycle, or the cycle during which a weight determination is normally made. Thus, it becomes virtually impossible for any filtering system to extract an unwanted output from a weight output.

Even shock-mounting the weighing unit, which is the practice followed in some prior art weighing systems, can become a detriment depending upon the frequency of the disturbance in supporting numbers, because such shock mounts might create a resonant condition and thus amplify disturbing effects on the weighing unit.

The scale module described herein, in its preferred form, utilizes a system which rejects all disturbances of all frequencies, thus keeping them out of the system entirely rather than attempting to filter them out after they enter the system. The manner in which this is accomplished is described below.

There are basically three general types of disturbances that can be imparted to devices mounted to the frame of machinery, or for that matter, devices that are mounted onto any support that is free to move, be it a floor in a factory or any part of a structural member.

The first of these is a disturbance resulting from motion in a horizontal plane. The scale module of the present invention is unaffected by such a disturbance from any direction in a horizontal plane.

The second general type of disturbance results from motion in a vertical plane. The scale module of the present invention is unaffected by such a disturbance.

The third general type of disturbance results from motions involving acceleration ratios, or motions that produce a couple, or rotational force, such as a rocking base or frame. This third type of disturbance is the most difficult with which to deal since in the weighing operation most scales utilize the principle of measuring angular or rotational motion of a member, such as a lever or platform, around an axis comprising a scale fulcrum, and they produce an output which is a measure of the rotation of that member around that fulcrum or axis.

In the accompanying drawings, we have illustrated a preferred embodiment of the structure of our scale module along with diagrammatic illustration of the principles involved in our invention and the advantages thereof.

In these drawings:

FIGURE 1 is a vertical longitudinal sectional view of the preferred scale module embodying double lever systems.

FIGURE 2 is a horizontal sectional view taken along line 2—2 of FIGURE 1.

FIGURE 3 is a transverse vertical sectional view taken along line 3—3 of FIGURE 1.

FIGURE 4 is a transverse vertical sectional view taken along line 4—4 of FIGURE 1.

FIGURE 5 is a fragmentary detail in perspective illustrating the cross-flex arrangement used in connection with each of the lever systems.

FIGURE 6 is a schematic view illustrating the lack of effect on the scale module of shock forces directed perpendicularly in a vertical plane and which tend to move the scale module bodily in a vertical plane.

FIGURE 7 is a similar view but showing the lack of effect on the scale module of shock forces exerted in a vertical plane that tend to rock the scale module in a vertical plane.

FIGURE 8 is a schematic view illustrating the lack of effect on the scale module by shock forces directed horizontally on the scale module and which tend to move it bodily in a horizontal plane.

FIGURE 9 is a similar view but showing the lack of effect on the scale module of shock forces applied vertically and tending to tilt the scale module vertically.

FIGURE 10 is a longitudinal vertical sectional view through the housing of a modified type of scale module involving features of the present invention but which uses a single lever system shown mainly in elevation.

With particular reference to FIGURES 1–5 of the drawings, we have illustrated the present invention embodied in a weighing scale unit or module which may be of a type particularly useful in checkweighing and which includes two lever systems that oppose and balance each other under normal conditions and even under substantially all conditions of shock and vibration. In FIGURE 1, these lever systems are indicated generally at 11 and 12 and are shown disposed within a base housing 13. The two lever systems are identical except that they are allochiral and, therefore, a detailed description of only one will be given below. A commodity outrider 14 is connected to the two lever systems and may carry a platform 15 for receiving the commodity to be checkweighed but it is to be understood that this platform is shown as an example of a commodity supporting member and that instead of a platform, a receiving pan, hopper, or other container or support may be provided for receiving and supporting the material or article during weighing or checkweighing. The parts so far generally described are the main parts of the scale module and the details thereof and their connection to each other and their operation will now be described more fully.

The platform 15 is rigidly carried in a suitable manner on the upper end of the outrider 14 as by means of a post 16 which passes for vertical movement through an opening 17 in the top of the housing 13. The outrider 14 (FIGURES 1 and 4) is disposed transversely of the housing 13 for movement vertically therein and is of substantially rectangular form. The outrider is mounted for vertical movement on a pair of laterally spaced, longitudinally extending, upper stabilizer flexures 18 and a pair of laterally spaced, longitudinally extending, lower stabilizer flexures 19. These flexures are formed of leaf springs and the inner end of each flexure is attached to the outrider 14 at its respective corner by a clamping screw 20.

The outer ends of the flexures 18 and 19 are anchored in fixed vertical positions by being attached to a rigid support bracket 21 (FIGURES 1 and 3) which depends from the upper wall of the housing 13 and is rigidly attached thereto by means of the bolts 22. It will be noted that the bracket 21 is transversely disposed in the housing and is provided with a lever-receiving space 23 opening outwardly toward one side edge thereof. Each of the flexures 18 or 19 has its outer end anchored to the bracket 21 at a corner thereof by means of a screw 24. Thus, the pairs of flexures 18 and 19 will normally be in horizontal planes which are vertically spaced and parallel with each other. To control the effective length of the stabilizer flexures 18 and 19, stiffener clamps 25 may be applied respectively thereto intermediate the lengths thereof.

Thus, the outrider 14 is supported by the flexures 18 and 19 for vertical movement in response to vertical movement of the platform 15 created as a result of the application of a weight thereto of greater or lesser amount than the commodity weight for which the scale is balanced. The lever systems 11 and 12, previously mentioned, are operatively connected to the outrider 14 to provide a preselected resistance to movement of the platform 14 from a predetermined balanced position. Crossed flexures 31 and 32 form a part of the respective lever systems 11 and 12 and offer resistance to movement of the levers of the systems away from a predetermined balanced condition.

Each set of crossed flexures 31 and 32 (FIGURES 1 and 4) comprises a pair of normally upright vertical flexures 33 and a pair of normally horizontal flexures 34 which are disposed in crossed relationship substantially midway of their length. The flexures of each pair 33 and 34 are in laterally spaced parallel relationship. The flexures 33 are disposed laterally inwardly of the flexures 34 which are spaced laterally more than the flexures 33 and are, therefore, outermost. The flexures of each pair 33 are spaced apart laterally sufficiently to receive the associated lever bar or beam 35. The inner end of the lever bar 35 is connected by the push pull strap 36 to the commodity outrider 14. The pull strap is a flexure which may also be formed of a leaf spring and its upper end is rigidly connected to the end of the lever bar 35 by the clamp screws 37 while its lower end is connected to the lower portion of the outrider 14 by clamping screws 38.

The flexures 34 are anchored to the housing 13 by means of a fixed bracket 40 which depends from the top of the housing and is fixed thereto by the bolts 41. The lower portion of this bracket straddles the lever bar 35 in such a manner as to permit vertical movement thereof.

The inner ends of the flexures 34 are clamped to the lower end of the bracket 40 by means of the clamp screws 42. The outer ends of these flexures 34 are connected by the clamp screws 43 to a bracket 45 (FIGURES 1 and 5) which has a portion straddling the upper edge of the lever bar 35 and is secured thereto in a fixed position by the bolts 46. The flexures 33 are connected at their upper ends by clamp screws 47 to the inner edge of the bracket 45 and at their lower ends by the clamp screws 48 outwardly projecting portions of the bracket 40. Thus, there is a flexible connection between the lever bar 35 and the housing which normally resists movement of the lever bar 35 away from its predetermined balanced position. Any movement of the outrider 14 is resisted by both lever systems 11 and 12 which are connected thereto by the pull straps 36.

Each lever bar 35 may carry a counterweight 50 for slidable movement along the bar and the weight may be fixed in a selected adjusted position by means of a setscrew 51. These weights are adjustable to adjust the balance of the system to a neutral or balanced condition for a predetermined load or range of loads that may be applied to the platform 15 and associated outrider 14, including any commodity transfer or holding mechanism. Also each lever bar 35 may be provided with a depending pin 52 which has a weight 53 mounted for vertical sliding movement thereon and provided with a setscrew 54 for fixing it in adjusted position. These weights are adjustable also to provide a neutral or balanced position for the levers without pendulum effect. The outrider 14 may be provided with a rigid horizontal lateral extension 55 at its lower end which is disposed between a pair of relatively vertically adjustable stop screws 56. These stop screws will limit travel of the platform 15 and outrider 14 to a preselected maximum.

The weighing mechanism may, if desired, be provided with vibration dampening means. In the drawings (FIGURE 4), we have illustrated an oil or hydraulic dashpot 60 as the means for stopping oscillations of the lever systems 11 and 12. The cylinder or container of this dashpot is fixed on a support 61 that is part of the housing 13 and the piston of the dashpot is connected to a rigid arm 62 extending laterally outwardly from the outrider 14. The dashpot is preferably adjustable over a range and may be filled with a temperature stable fluid such as silicone.

As indicated, the lever systems 11 and 12 are brought into neutral or balanced position with a predetermined weight on the platform 15. This predetermined weight will correspond to the weight of the commodity or article to be applied to the platform 15 in the checkweighing operation. This neutral or balanced condition of the lever systems 11 and 12 is accomplished by adjusting the weights 50 on the respective levers 35, as indicated schematically in FIGURE 6. Instead of applying the weight to the commodity platform in tare adjustment and rebalancing for different weights, removable external weights may be otherwise attached to the outrider 14 to load the scale to a predetermined amount. For the lightest commodtiy, the maximum number of external weights are applied and as heavier commodities are to be weighed, external weights are removed to return the system to balance. This method is commonly known as substitution weighing. Also, as indicated, the same results can be obtained by adjustment of the weights 50 along the lever bars 35. Slight adjustment for variation in tare may be accomplished by adjusting the smaller weights 53 on the levers.

Another system of rebalancing is through the use of an external adjustable spring or springs, similar to that arrangement disclosed in connection with the modification of the scale illustrated in FIGURE 10, the spring or springs being attached to one or more internal members of the weighing mechanism with adjustable means conveniently accessible to an operator for rebalancing. With this system, the spring force available would represent a small percentage of total forces in the system to minimize undesirable effects of unequal masses when the weighing unit is subjected to external disturbances.

Assuming the scale has been balanced for a predetermined weight to be checked and the tare has been balanced out of the mechanism, the weighing scale module is now ready to function in the weighing operation. If a commodity or an article of the predetermined weight is placed on the platform 15, there will be no movement of the lever systems 11 and 12. However, if the weight of the article is over or under the predetermined amount, the lever systems will be actuated to indicate whether the article is underweight or overweight. A suitable means may be associated with the weighing module (not shown) for developing a signal and operating indicating mechanism and reject or classifying mechanism. For example, this arrangement may be similar to that disclosed in the patent to Schieser et al. No. 2,568,255. This means may take the form of a transducer for converting motion of any part of the system to a signal corresponding to weight, for example, a linear variable differential transformer, although any other suitable commercially available type transducers may be used.

FIGURES 6–9 illustrate certain advantages of this double lever system scale module where the one lever system balances the other since they are on opposite sides of the normally vertical range line which passes through the axis of the outrider 14. This is the axis where the weight force to be determined is applied to the lever systems. FIGURE 6 shows that the fulcrum points 31a and 32a provided by the crossed flexures 31 and 32 are along the range line running horizontally through the normally horizontal and longitudinally extending center lines or axes of the lever bars 35. Vibrations or shock in the horizontal plane are ineffective in producing output from the scale module because the system uses equal masses above and below the range line or longitudinal axis which passes through the centers of mass of the levers of the systems 11 and 12 to eliminate any pendulum effect above or below the lever. The vertically adjustable tare weights 53 provide a means for adjusting the amount of weight above and below the range line. If the scale base 13a, which corresponds to the housing 13, is subjected to acceleration by forces or shocks in a vertical direction, as indicated by the arrows A in FIGURE 6, the accelerating forces act equally on the equal masses above and below the fulcrum line or range line, which is normally horizontal and passes through the fulcrum points provided by the crossed flexures 31 and 32, to provide no motion of the levers of the system 11 and 12 and, therefore, no output from the scale module.

In like manner, vibration or shock applied in a horizontal plane, as indicated by the arrow B in FIGURE 8, produces no output because there are balanced equal masses on each end of the lever systems 11 and 12 and on opposite sides of the normally vertical range line or outrider axis. As previously indicated, on one end of each of the bars 35 of the lever systems 11 and 12 is the movable weight 50. To the other end of each lever bar is connected the pull strap 36 which supports the outrider 14 and associated platform 15. The weight of the poise weight 50 and one-half of the weight of the platform 15 and its outrider 14 are such that the corresponding lever system 11 or 12 is balanced in a neutral position. Thus, at this time, the crossed flexures 31 and 32 are in their normally straight, non-stressed condition. For a scale loaded with a commodity or article, as indicated, a neutral non-stressed condition, as described above, is achieved by adjusting the poise weights 50 outwardly away from the corresponding fulcrum points 31a or 32a until a neutral position is again achieved. If the scale base is subjected to acceleration in a horizontal plane as indicated, the accelerating forces act equally on equal masses on both sides of the lever fulcrums to produce no motion of the lever systems 11 and 12 and, therefore, no output from the scale module.

Both of the earlier described disturbance forces, vertical and horizontal, can be rejected by each of the lever systems 11 or 12 with equal masses above and below the fulcrum and to the right and left of the fulcrum. However, if the scale is subjected to a disturbance such as a rocking motion which produces a couple, then the rejection of that disturbance must be accomplished by the combined action of the two lever systems 11 and 12. Rocking disturbances and their lack of effect on the scale module are indicated in FIGURES 7 and 9.

With reference to FIGURE 7, assume that the scale base 13a is placed on a rocking platform so that the scale base is raised at the left hand end and at the same time is lowered at the right hand end, as indicated by the arrows C and D respectively, the inertia of the weight 50 of the lever system 11 causes it to tend to move closer to the base 13a thus producing a moment of force around the fulcrum provided by the crossed flexures 31a. The result is an upward force on the outrider 14 produced by the pull strap 36 of the lever system 11. However, the right hand end of the base 13a is moving downwardly and the inertia of the weight 50 of the lever system 12 tends to cause it to move upwardly away from the base 13a thus producing a moment of force around the crossed flexures 32a. The result is a downward force on the outrider 14 transmitted through the associated pull strap 36. The total force exerted on the outrider 14 is, therefore, the normal force produced by the lever systems under conditions of zero acceleration and that produced by the upward and downward forces, plus and minus, produced by the actions of the lever systems 11 an 12 under the accelerations described above. Regardless of the point at which the axis of a disturbance is placed, the algebraic sum of the forces produced by the two lever systems will balance each other and cancel the effect of the disturbances. For example, as indicated in FIGURE 9, if one end of the base is the fulcrum axis, as indicated at E, and remains nearly stationary, and the other end is raised through a large arc, as indicated by the arrows F, the two lever systems 11 and 12 will act together to cancel out the effects of the base movement.

As indicated above, it is preferred that a two-lever system scale module be used according to this invention but a single lever system according to our invention has many advantages since with equal masses above and below the normally horizontal range line or lever axis and to the right and left of the fulcrum, a number of the disturbances will be rejected as described above. Such a scale module arrangement using a single lever system is indicated in FIGURE 10. In this instance, the base 13b will support a single lever system 11b. This lever system will be mounted on the crossed flexures 31b substantially as before which are carried by a support 40b. One end of the lever system is connected by a pull strap 36b to an outrider 14b which carries a commodity platform 15b and the other end carries an adjustable counterweight 50a as before. The outrider 14b is carried by the stabilizing flexures 18b and 19b which are anchored to the rigid support 21b carried by the base 13b. A dashpot 60b may be connected to one end of the lever bar 35b. Also this end of the lever bar may have a rebalancing spring 50b connected thereto. This spring will be connected to the end of the lever and to a vertically adjustable pin 50c which is movable vertically by means of an adjusting screw 51c rotatably mounted in a fixed axial position on the base and rotated by means of a knob 51b accessible from a point outside the housing. The spring 50b will aid in minimizing the effects of unequal masses when the unit is subject to external disturbances. As previously indicated, because this arrangement also provides for equal masses above and below the fulcrum 31c and to the right and left of the fulcrum and since the fulcrum is along the range line corresponding to the normally horizontal axis or center line of the lever 35b, disturbance forces directed in vertical and horizontal planes will be rejected by this unit.

It will be apparent that this scale module has many advantages and one important advantage is its compactness which makes it possible to easily mount it in multiples in limited spaces. Unlike conventional bearings, the parallel flexures which mount the commodity outrider on the base remain virtually friction-free even under offset loading conditions. There are no friction bearings in the entire module. All spring flexures in the scale systems are neutral when it is in balance and thus the system is highly stable even when built of inexpensive, non-temperature compensated materials. However, in typical units, temperature compensated, corrosion-proof flexures should be used. The scale module is usually preloaded to weigh a commodity or article of predetermined weight so that it can be used in checkweighing but the advantages claimed are almost as valuable when the module is used for catch-weighing. In such an instance, the restoring force is exerted primarily by the deformation of the crossed fulcrum flexures. By selection of flexure spring gauge and flexure length, any degree of response speed may be achieved to meet requirements of the application. Shorter and heavier gauge crossed flexures result in less movement of the weighing platform and outrider per unit of weight but numerous commercial means are available to accurately measure and read out with great accuracy motions far less than those produced by the described mechanism. Damping systems employed to stop system oscillations may be viscous, hydraulic, magnetic or any other near static frictionless system compatible with weighing systems in general.

Force balance by electromagnetic means is feasible with the described system because the disturbances which otherwise affect conventional scales and which cause overcorrection and hunting in the feedback systems are eliminated through the stabilization principles incorporated in the scale module. With this scale module, it is feasible to mount it on a rotating table such as a rotary filler or a rotary checkweigher, and to achieve efficiency without the disturbances normally associated with such equipment.

Having thus described this invention, what is claimed is:

1. A weighing scale comprising a weighing lever having a longitudinal axis extending through the center of mass thereof, fulcrum means for supporting the lever for swinging movement, said means including crossed flexures connected between the lever and a support to permit swinging of the lever relative to the support in response to weight applied to the lever along its axis spaced from said crossed flexures, said crossed flexures providing a fulcrum axis at the point of crossing of the flexures, said fulcrum axis being in the same plane as the axis extending through said lever.

2. A weighing scale comprising a weighing lever having a longitudinal axis extending through the center of mass thereof, a support for carrying the lever, fulcrum means for mounting the lever on the support in a normally horizontal position but for swinging movement in a vertical plane, said means including crossed flexures connected between the lever and the support to permit swinging movement of the lever relative to the support in response to weight applied to the lever along its axis spaced from said flexures, said crossed flexures providing a fulcrum axis at the point of crossing of the flexures, said fulcrum axis being in a common horizontal plane with the normally horizontal axis extending through said lever.

3. A weighing scale according to claim 2 including an outrider for supporting the weight to be applied to the lever, means for mounting said outrider for vertical movement and comprising horizontally extending flexures supporting said outrider from a support fixed relative to said lever, and a connection for operatively connecting the lever to the outrider so that vertical movement of the lever produces vertical movement of the outrider.

4. A weighing scale comprising a pair of weighing lever systems located at opposite sides of a vertical line and opposing and balancing each other, each of said lever systems comprising a weighing lever having a longtiudinal axis extending through the center of mass thereof, a support for carrying the lever, fulcrum means for mounting the lever on the support for swinging movement in a vertical plane, said means including crossed flexures connected between the lever and the support to permit swinging movement of the lever relative to the support in response to weight applied to the lever along its axis spaced from said crossed flexures, said crossed flexures providing a fulcrum axis at the point of crossing of the flexures, said fulcrum axis being in a common horizontal plane with the normally horizontal axis extending through said lever.

5. A weighing scale according to claim 4 including a normally vertically disposed outrider having a vertical axis corresponding to said vertical line; for supporting the weight to be applied to the levers and mounted for vertical movement, means for supporting said outrider for said vertical movement and comprising normally horizontally extending flexes supported by a support fixed vertically relative to said levers, said levers extending in opposite directions outwardly from the outrider and having their adjacent inner ends operatively connected to said outrider.

6. A weighing scale according to claim 5 in which each of said levers has a weight carried thereon outwardly of the fulcrum thereof.

7. A weighing scale comprising a lever having a longitudinal axis extending through the center of mass thereof, crossed flexures providing a fulcrum supporting said lever for swinging movement in a vertical direction, said lever having its axis extending through said fulcrum and normally horizontal, an outrider connected to said lever for movement thereby, and means operatively connected to said lever for counterbalancing said outrider, said outrider and counterbalancing means providing equal masses above and below the normally horizontal lever axis and to the right and left of the fulcrum.

References Cited
UNITED STATES PATENTS

| | | | |
|---|---|---|---|
| 2,969,228 | 1/1961 | Appins | 177—229 |
| 3,137,358 | 6/1964 | Jungmayr | 177—229 X |
| 3,148,742 | 9/1964 | Giulie | 177—229 X |
| 3,191,702 | 6/1965 | Kohlhagen | 177—229 |

RICHARD B. WILKINSON, *Primary Examiner.*

GEORGE H. MILLER, Jr., *Assistant Examiner.*